United States Patent [19]

Schnuell

[11] 4,449,268
[45] May 22, 1984

[54] CASTER WHEEL BRAKE HAVING AN OVERCENTER LATCH

[75] Inventor: Henry A. Schnuell, Milwaukee, Wis.

[73] Assignee: E. R. Wagner Mfg. Co., Milwaukee, Wis.

[21] Appl. No.: 343,889

[22] Filed: Jan. 29, 1982

[51] Int. Cl.³ .............................................. B60B 33/00
[52] U.S. Cl. ..................................... 16/35 R; 188/1.12
[58] Field of Search ............... 16/21, 26, 35 R, 35 D; 188/1.12

[56] References Cited

U.S. PATENT DOCUMENTS

| | | | |
|---|---|---|---|
| 1,633,638 | 6/1927 | Jarvis et al. | 16/35 R |
| 2,081,594 | 5/1937 | McIntosh | 16/35 R |
| 2,484,094 | 10/1949 | Jackson | 16/35 R X |
| 2,494,696 | 1/1950 | Forbes | 16/35 R |
| 2,709,828 | 6/1955 | Noelting et al. | 16/35 R |
| 2,905,275 | 9/1959 | Kostolecki et al. | |
| 3,162,888 | 12/1964 | Mobus | 16/35 R |
| 3,388,419 | 6/1968 | Crawford | 16/35 R |
| 3,687,241 | 8/1972 | Fontana | 16/35 D X |
| 3,828,392 | 8/1974 | Bolger | 16/35 R |
| 3,881,216 | 5/1975 | Fontana | 16/35 R |
| 3,890,669 | 6/1975 | Reinhards | 16/35 R |
| 3,902,576 | 9/1975 | Pitan et al. | 16/35 R X |
| 3,942,608 | 3/1976 | Frank et al. | |
| 4,035,864 | 7/1977 | Schroder | 16/35 R |

*Primary Examiner*—Fred Andrew Silverberg

[57] ABSTRACT

A caster wherein a brake plate is supported for pivotal movement about an axis intermediate the opposite ends of the brake plate and adjacent the caster yoke and beneath the caster yoke. One end of the brake plate is connected to a toggle mechanism including a wire having one end anchored to the plate and pivots about the caster wheel axis. When the lever is pivoted over center, the wire pulls one end of the brake plate into engagement with the caster wheel thereby braking the caster wheel. The opposite end of the brake plate engages a bearing race fixed to the caster shaft and to thereby brake the caster against rotation.

5 Claims, 4 Drawing Figures

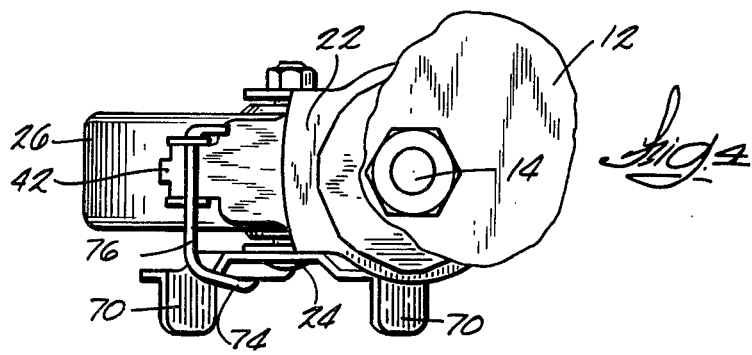
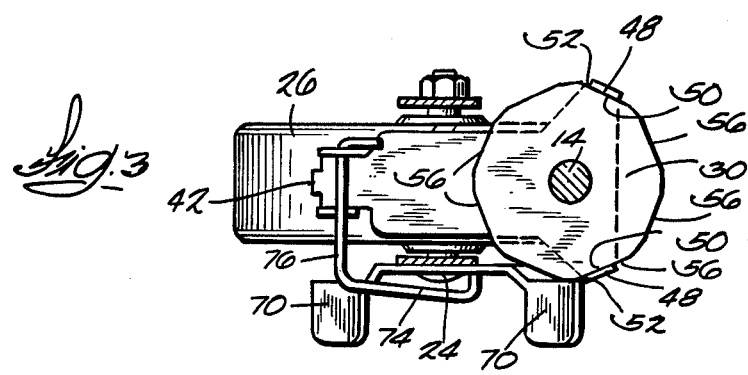
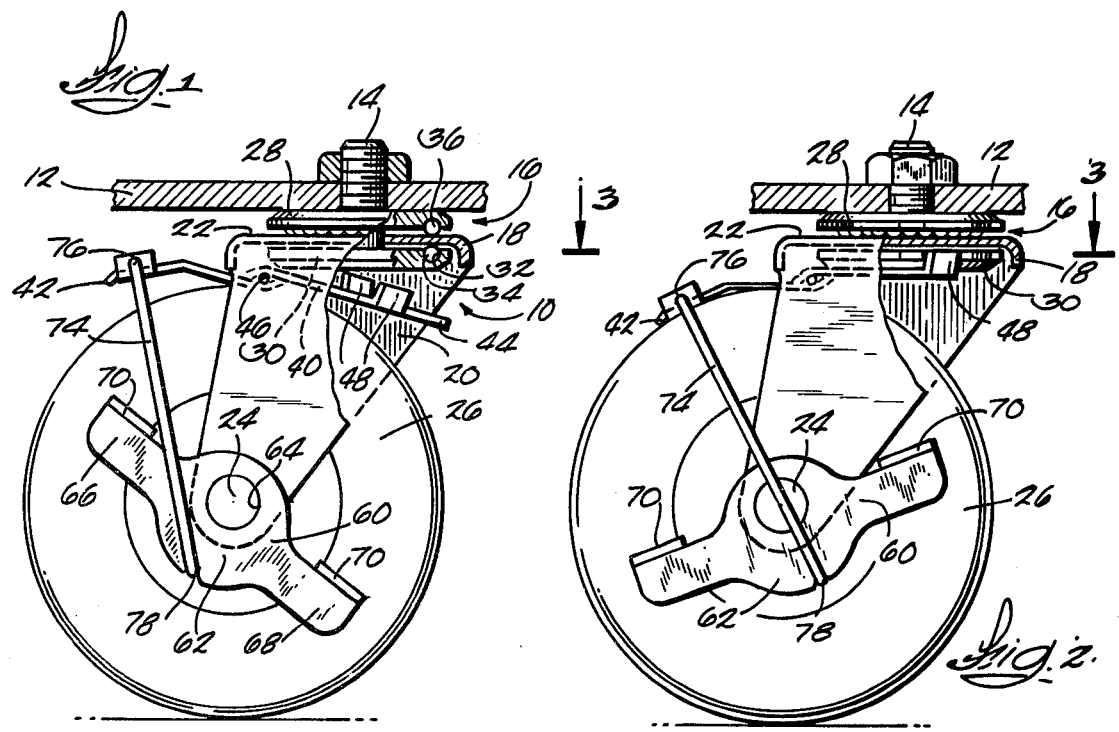

CASTER WHEEL BRAKE HAVING AN OVERCENTER LATCH

FIELD OF THE INVENTION

The invention relates to casters and more particularly to brake or locking mechanisms for casters and for braking the wheel of the caster and for locking the caster yoke to prevent rotation of the caster yoke about a vertical axis.

BACKGROUND PRIOR ART

In many applications for casters it is desirable that the caster include means for braking the wheel of the caster against rotation and simultaneously braking the caster yoke against rotation. An example of a prior art caster including means for braking the wheel and the yoke against rotation is illustrated in the Bolger U.S. Pat. No. 3,828,392, issued Aug. 13, 1974.

Attention is also directed to the Fontana U.S. Pat. No. 3,687,241, issued Aug. 29, 1972; the Pitan et al. U.S. Pat. No. 3,902,576, issued Sept. 2, 1975; the Crawford U.S. Pat. No. 3,388,419, issued June 18, 1968; the Jarvis et al. U.S. Pat. No. 1,633,638, issued June 28, 1927; and the Mobus U.S. Pat. No. 3,162,888, issued Dec. 29, 1964.

Attention is further directed to the McIntosh U.S. Pat. No. 2,081,594, issued May 25, 1937; the Reinhards U.S. Pat. No. 3,890,669, issued June 24, 1975; the Shroder U.S. Pat. No. 4,035,864, issued July 19, 1977; the Kostelecki et al. U.S. Pat. No. 2,905,275, issued Sept. 22, 1959; and the Frank et al. U.S. Pat. No. 3,942,608, issued Mar. 9, 1976.

SUMMARY OF THE INVENTION

The present invention provides an improved caster having a support member adapted to be connected to a load to be supported by the caster, and a yoke including a pair of parallel spaced arms joined by a horizontal web, the arms including lower ends rotatably supporting a wheel. Means are also provided for rotatably joining the yoke to the support member for rotation about a vertical axis, this means including a bearing race positioned adjacent the lower surface of the web. The caster also includes means for braking the wheel against rotation and the yoke against rotation about the vertical axis. The means for braking includes a brake plate pivotably supported by the yoke for pivotal movement about an axis parallel to the axis of rotation of the wheel, the brake plate including means for selectively positively engaging the race positioned adjacent the lower surface of the web for preventing rotation of the yoke with respect to the race, and the opposite end of the brake plate being adapted to selectively engage the wheel to clamp the wheel against rotation. The means for braking also includes means for causing selective pivotal movement of the brake plate from a first position wherein one end of the brake plate is spaced from the face and the other end of the brake plate is spaced from the wheel, and a second position wherein the one end of the brake plate engages the race and wherein the end of the brake plate engages the wheel.

In one embodiment of the invention the means for causing selective pivotal movement of the brake plate includes a brake lever supported for pivotal movement about the axis of rotation of the wheel, the brake lever being pivotably movable about its axis between a first position wherein the brake plate is in the first position to a second position wherein the brake plate is in the second position.

In a preferred form of the invention the braking means further includes an elongated member having an upper end joined to an end of the brake plate and a lower end pivotally joined to a portion of the brake lever intermediate its opposite ends and below the pivot axis of the lever.

Another feature of the invention is the provision of a brake plate including means for engaging opposite sides of the periphery of the disc to clampingly engage the disc therebetween.

In a preferred form of the invention the periphery of the race includes a plurality of generally flat surfaces spaced circumferentially around the race and the means for engaging the race includes a pair of clamping members, one of the clamping members extending upwardly from one side of the brake plate and adapted to engage one of the flat surfaces, and the other of the clamping members extending upwardly from an opposite side of the brake plate and being adapted to engage another of the flat surfaces when the brake member is moved to the second position.

Various other features and advantages of the invention will be apparent by reference to the following description of a preferred embodiment, to the claims, and to the drawings.

BRIEF DESCRIPTION OF THE DRAWINGS

FIG. 1 is a cross section elevation view of a caster embodying the invention.

FIG. 2 is a view similar to FIG. 1 and showing the brake mechanism of the caster in braking relation.

FIG. 3 is a cross section view taken along line 3—3 in FIG. 2.

FIG. 4 is a plan view of the caster illustrated in FIG. 1.

Before describing at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF A PREFERRED EMBODIMENT

Illustrated in FIG. 1 is a caster 10 embodying the invention and including a support member adapted to support a load 12. While the support member could have various configurations depending on the intended use of the caster and the load to be carried by the caster, in the illustrated arrangement it comprises a threaded pin or post 14 supported by a bearing assembly 16. The bearing assembly 16 is in turn supported by a caster yoke 18 comprised of a pair of downwardly extending legs 20 joined at their upper ends by a horizontal plate or web 22. The lower ends of the legs 20 of the yoke 18 support an axle 24 which, in turn, supports the caster wheel 26.

Referring again to the bearing assembly, in the illustrated construction, it is comprised of a pair of spaced apart generally circular discs or bearing races 28 and 30 which are fixed to the post 14 and positioned above and below the web 22 of the yoke 18 to sandwich the web 22 therebetween. The upper surface of the race 30 defines a circular bearing race surface 32 surrounding the vertical axis of the post 14 and adapted to support a plurality of ball bearings 34 engageable with the lower surface of the web 22, and the lower surface of the plate 28 defines a second circular bearing race surface surrounding the axis of the post 14 and for supporting ball bearings 36 engageable with the upper surface of the web 22.

Means are further provided for selectively braking the wheel 26 against rotation about the axle 24 and for simultaneously braking the yoke 18 against rotation about the vertical axis of the post 14. The means for selectively braking includes a brake plate 40 which is pivotably supported above the wheel 26 and between the legs 20 of the yoke 18 for limited pivotal movement about an axis parallel to the axis of rotation of the wheel. The brake plate 40 includes opposite ends, one end 42 including means for engaging the periphery of the wheel 26 and for locking the wheel against rotation. The opposite end 44 of the brake plate 40 includes means for selectively engaging the race 30 in such a manner that the yoke 18 is prevented from rotation about the race 30.

Referring more particularly to the specific construction of the brake plate 40 illustrated in the drawings, it comprises an elongated plate or lever having a width somewhat less than the distance between the legs 20 of the yoke. The forward end 42 of the plate 40 is bent downwardly such that that end can grip the periphery of the wheel 26 in frictional engagement as shown in FIG. 2. The brake plate 40 is pivotably supported intermediate its opposite end by a pivot pin 46. The pivot pin 46 is supported at its opposite ends by bores provided in the legs 20 of the yoke 18 and such that the pivot pin 46 is pivotable about an axis parallel to the axis of rotation of the wheel. The pivot pin 46 is located above the periphery of the wheel and in forwardly spaced relation from the vertical pivot axis of the yoke 18 such that the end 44 of the brake plate 40 adapted to engage the race 30 can move upwardly into engagement with the race 30 when the end 42 of the brake moves downwardly into braking engagement with the periphery of the wheel.

While the end 44 of the brake plate 40 adapted to clampingly engage the race 30 can have various constructions, provided that it includes suitable means for fixedly engaging the race 30 when the end 44 of the brake plate is moved upwardly into engagement with the race 30, in the construction illustrated in the drawings, that end of the brake plate includes a pair of rigid tabs 48 extending upwardly from opposite sides of the end 44 of the plate. Each of the upwardly extending tabs 48 slopes upwardly and outwardly from the lateral edges of the plate 40. The tabs 48 each include an outwardly inclined planar surface 50 (FIG. 3) adapted to engage the periphery 52 of the race 30. As best shown in FIG. 3, the generally circular race 30 is also particularly shaped to facilitate clamping engagement of the tabs 48 with the race 30 in such a manner as to prevent rotation of the yoke 18 around the race. More particularly, the race 30 is constructed such that its periphery includes a plurality of flat surfaces 56 spaced circumferentially around the race and such that the race 30 has a generally octagonal shape when viewed in plan.

In operation, when the brake plate 40 is pivoted so to cause the end 42 of the brake lever to engage the periphery of the wheel 26, the opposite end 44 of the brake lever will move upwardly toward the race 30, and the spaced tabs 48 will move upwardly on opposite sides of the race with the planar inner faces 50 of the tabs engaging the surfaces 56 of the periphery of the race thereby gripping the race 30 so as to block the yoke 18 against rotation with respect to the race.

The means for braking also includes means for causing pivotal movement of the brake plate 40 from a first position shown in FIG. 1 to the position shown in FIG. 2 wherein the end 42 of the brake plate engages the wheel 26 and the end 44 of the brake plate engages the race 30. This means for causing pivotal movement of the brake plate includes a brake lever 60 supported by the axle 24 for pivotal movement about the axis of rotation of the wheel 26. More particularly, the brake lever 60 illustrated in the drawings includes a central circular portion 62 having a bore 64 therein adapted to house the axle 24. The bore 64 is located radially outwardly of the center of the circular portion 62 such that the circular portion is mounted eccentrically on the axle 24. The brake lever 60 also includes opposed lever arms 66 and 68 including flanges or tabs 70 on their outer ends to permit an operator to push downwardly on the opposite ends of the brake lever.

Means are also provided for connecting the end 42 of the brake plate 40 to a lower portion of the periphery of the circular portion 62 of the brake lever 60. While the means for connecting can have various constructions, in the illustrated arrangement it includes a rod 74 pivotally joined at its upper end 76 to the forward end 42 of the plate 40 and pivotably joined at its lower end 78 to a lower portion of the periphery of the circular portion 62 of the brake lever 60 and such that as the lever arm 66 of the brake lever is pushed downwardly, the disc portion 62 moves eccentrically about the axis of the axle 24, and the rod 74 pulls the end 42 of the brake plate 40 downwardly into engagement with the wheel 26. As the circular portion of the eccentric lever 60 rotates from the position shown in FIG. 1 to the position shown in FIG. 2, the lower end 78 of the rod 74 moves past the pivot axis of the circular portion so as to provide an overcenter lock arrangement. Release of the brake then requires downward force on the end 68 of the lever 60 in order to cause pivotal movement of the lever 60 such that the rod 74 moves past the pivot axis and to a position wherein the brake plate 40 is released from its braking position.

Various features of the invention are set forth in the following claims.

I claim:
1. A caster comprising
 a support member adapted to be connected to a load to be supported by the center,
 a yoke including a pair of parallel spaced arms joined by a horizontal web, said arms including lower ends rotatably supporting a wheel for rotation about a horizontal axis, and said web including a lower surface,
 means for rotatably joining said yoke to said support member for rotation about a vertical axis, said means for rotatably joining including a disc member fixed to said support member and positioned adjacent the lower surface of said web, and
 means for braking said wheel against said rotation and said yoke against rotation about said vertical axis, said means for braking including a brake member having opposite ends, said brake member being pivotally supported by said yoke for pivotal movement about an axis parallel to the axis of rotation of said wheel, one end of said brake member including means for selectively positively engaging said disc member positioned adjacent the lower surface of said web for preventing rotation of said yoke with respect to said disc member, and the other end of said brake member being adapted to selectively engage said wheel to brake said wheel against rotation, and means for causing selective pivotal movement of said brake member from a first position wherein said one end of said brake member is spaced from said disc member positioned adjacent the lower surface of said web and said other end of said brake member is spaced from said wheel, and a second position wherein said one end of said brake member engages said disc member positioned adjacent the lower surface of said web and wherein said other end of said brake member engages said wheel, said means for causing selective pivotal movement of said brake member including a brake lever having opposite ends and being supported for pivotal movement about said axis of rotation of said wheel between a first position wherein said brake member is in said first position and a second position wherein said brake member is in said second position, and means for joining said other end of said brake member to said brake lever and for moving said brake member to said brake member first position when said brake lever is moved to said brake lever first position and for moving said brake member to said brake member second position when said brake lever is moved to said brake lever second position, said means for joining including an elongated member having an upper end joined to said other end of said brake member and a lower end pivotally joined to said brake lever intermediate its opposite ends and below said axis of rotation, said lower end of said elongated member moving past said axis of rotation of said wheel when said brake lever moves from said brake lever first position to said brake lever second position.

2. A caster as set forth in claim 1 and wherein said disc member comprises a bearing race including a periphery having opposite sides and wherein said means for engaging said disc member includes means for clampingly engaging opposite sides of said periphery.

3. A caster as set forth in claim 2 and wherein said periphery of said bearing race includes a plurality of generally flat surfaces spaced circumferentially around said race, wherein said one end of said brake member includes opposite sides, and wherein said means for engaging said disc member includes a pair of clamping members, one of said clamping members extending upwardly from one side of said one end and being adapted to engage one of said flat surfaces when said brake member is moved to said second position, and the other of said clamping members extending upwardly from the other side of said one end and being adapted to engage another of said flat surfaces when said brake member is moved to said second position.

4. A caster comprising a support member adapted to be connected to a load to be supported by the caster, a yoke including a pair of parallel spaced arms joined by a horizontal web, said arms including lower ends rotatably supporting a wheel for rotation about a horizontal axis, and said web including a lower surface, means for rotatably joining said yoke to said support member for rotation about a vertical axis, said means for rotatably joining including a disc member fixed to said support member and positioned adjacent the lower surface of said web, said disc member comprising a bearing race including a periphery having opposite sides and including a plurality of generally flat vertical surfaces spaced circumferentially around said race, and means for braking said wheel against said rotation and said yoke against rotation about said vertical axis, said means for braking including a brake member having opposite ends, said brake member being pivotally supported by said yoke for pivotal movement about an axis parallel to the axis of rotation of said wheel between a first position and a second position, one end of said brake member having opposite sides and including means for selectively clampingly engaging said disc member positioned adjacent the lower surface of said web for preventing rotation of said yoke with respect to said disc member, said means for clampingly engaging said disc member including means for engaging opposite sides of said periphery of said bearing race, said means including a pair of clamping members, one of said clamping members comprising a first planar tab extending upwardly from one side of said one end of said brake member and sloping upwardly and outwardly away from said vertical axis and said planar tab including a flat surface adapted to engage one of said flat surfaces of said periphery of said disc when said brake member is moved to said second position, and the other of said clamping members comprising a second planar tab extending upwardly from the other side of said one end of said brake member and sloping upwardly and outwardly away from said vertical axis and including a flat surface adapted to engage another of said flat surfaces of said periphery of said disc when said brake member is moved to said second position to clamp said periphery of said disc between said first planar tab and said second planar tab, and the other end of said brake member being adapted to selectively engage said wheel to brake said wheel against rotation, said first tab and said second tab being angled relative to each other in a vertical plane, said pivot axis of said brake member being horizontal and being positioned on one side of said vertical axis and said first planar tab and said second planar tab being positioned on an opposite side of said vertical axis whereby said first planar tab and said second planar tab are pulled into engagement with said flat surface of said disc when said brake member is moved to said second position and means for causing selective pitoval movement of said brake member from a first position wherein said one end of said brake member is spaced from said disc member positioned adjacent the lower surface of said web and said other end of said brake member is spaced from said wheel, and a second position wherein said one end of said brake member engages said disc member positioned adjacent the lower surface of said web and wherein said other end of said brake member engages said wheel.

5. A caster as set forth in claim 4 wherein said means for causing selective pivotal movement of said brake member includes a brake lever supported for pivotal movement about said axis of rotation of said wheel, said brake lever being pivotably movable about said axis between a first position wherein said brake member is in said first position and a second position wherein said brake member is in said second position.

* * * * *

UNITED STATES PATENT AND TRADEMARK OFFICE
CERTIFICATE OF CORRECTION

PATENT NO. : 4,449,268
DATED : May 22, 1984
INVENTOR(S) : Henry A. Schnuell

It is certified that error appears in the above-identified patent and that said Letters Patent is hereby corrected as shown below:

Column 4, line 55, the word "center" should read -- caster --.

Signed and Sealed this

Eighteenth Day of September 1984

[SEAL]

Attest:

GERALD J. MOSSINGHOFF

Attesting Officer

Commissioner of Patents and Trademarks